Jan. 26, 1954 J. B. ATWOOD 2,667,579

FREQUENCY CONTROL SYSTEM

Filed Oct. 6, 1949 2 Sheets-Sheet 1

INVENTOR
John B. Atwood
BY Harry [signature]
ATTORNEY

Jan. 26, 1954 J. B. ATWOOD 2,667,579

FREQUENCY CONTROL SYSTEM

Filed Oct. 6, 1949 2 Sheets-Sheet 2

INVENTOR
John B. Atwood
BY Harry Tunick
ATTORNEY

Patented Jan. 26, 1954

2,667,579

UNITED STATES PATENT OFFICE 2,667,579

FREQUENCY CONTROL SYSTEM

John B. Atwood, Riverhead, N. Y., assignor to Radio Corporation of America, a corporation of Delaware Application October 6, 1949, Serial No. 119,971

12 Claims. (Cl. 250—36)

Figure 1:
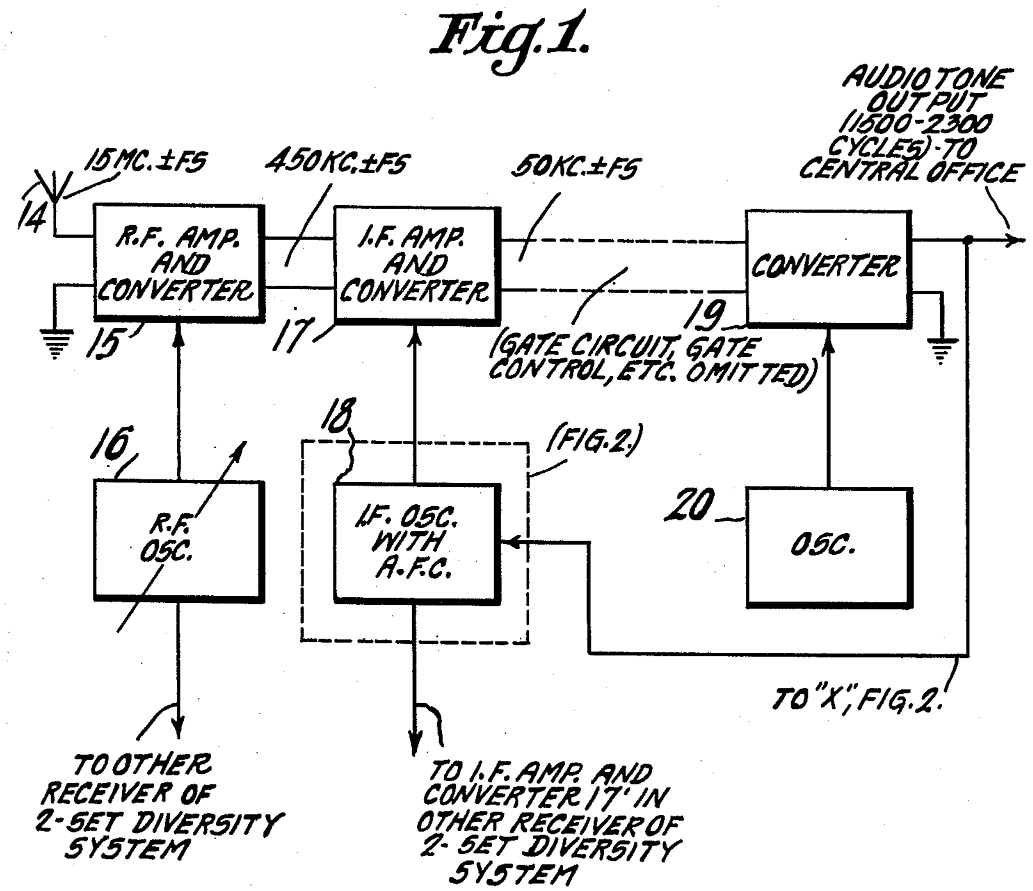

This invention relates to an automatic frequency control (AFC) system, and more particularly to an AFC system for receivers used in radio frequency carrier shift signaling.

One particular application of a control system in accordance with this invention is to receivers for radio frequency carrier shift (RFCS) radiophoto or facsimile signals and it will be described in connection therewith. However, it is to be understood that this invention is not limited to radiophoto receivers, but is useful also for frequency-shift telegraphy receivers, in which the transmitted carrier is shifted between two frequency values, one representing mark and the other space.

A receiver for RFCS radiophoto signaling should heterodyne the received signal down to an audio tone or frequency which can be utilized by the central office recording equipment. In a system in common use at the present time, the frequency corresponding to black in the picture is 2300 cycles and the frequency corresponding to white is 1500 cycles. There should not be more than a few cycles drift in the receiver output frequency, from these preassigned values (if the shades corresponding thereto are present in the picture), during the time required to record a picture, since if there is, there will be a noticeable change in the picture shading. Also, there should not be more than a few cycles drift from such preassigned values during the course of one scanning line, or else the picture shading will change from top to bottom. In other words, the tone frequency output of the receiver must be held very close to the assigned or predetermined frequency.

If the transmitter operates on a center frequency of fifteen megacycles, for example, the 800-cycle shift of the carrier (from "black frequency" to "white frequency") is only a small percentage of such center frequency, and the frequency drift is even smaller. There is no known AFC system, operating on intermediate frequency or higher frequency, which would respond to such small (percentagewise) drifts.

Accordingly, an object of this invention is to devise an AFC system for a RFCS radiophoto receiver, by the operation of which drifts in the audio tone output frequency of such receiver, from a predetermined or assigned reference value, are substantially eliminated.

Another object is to provide an AFC system for a RFCS receiver which operates very effectively.

In radiophoto signalling, a "black" reference frequency can be produced once each drum revolution at the transmitter by covering the gripper bar (which holds the picture being transmitted in place on the transmitting drum) with a black material. It has been proposed that this "black frequency" be maintained constant at the receiver output for the duration of the picture, since if it is so maintained, all the other parts of the picture will also be held properly (that is, on the correct frequency at the receiver output). According to this invention, the black reference frequency at the output of the receiver is automatically held very closely to the desired or predetermined value of 2300 cycles. This is done by automatic frequency control of a heterodyne or converter intermediate frequency (I. F.) oscillator, this frequency control being effected in such a manner that, irrespective of frequency drifts in the transmitter, in the high frequency oscillator at the receiver, or in other parts of the complete signalling system, the "black frequency" at the receiver output will be automatically maintained very close to the predetermined audio frequency value.

The angular velocity of the drum at the transmitter is rather low, since the drum rotates at a comparatively slow rate, such as 90 R. P. M. for example. Therefore, there is a substantial time interval between successive transmissions to the receiver of the black reference frequency. It has been found that it is not feasible to use a reactance-tube type of frequency control arrangement for radiophoto signalling, since it is almost impossible, as a practical matter, to devise a reactance tube frequency control circuit having a time constant sufficiently long to maintain the frequency of the controlled oscillator at the proper value during the time interval between successive transmissions of black frequency; therefore, even though this type of frequency control circuit is rather desirable from the standpoints of having no moving parts and having a high sensitivity of control, it cannot be used for RFCS radiophoto receiver control.

Therefore, another object of this invention is to devise a novel tuning-motor-type AFC arrangement for receivers.

Figure 2:
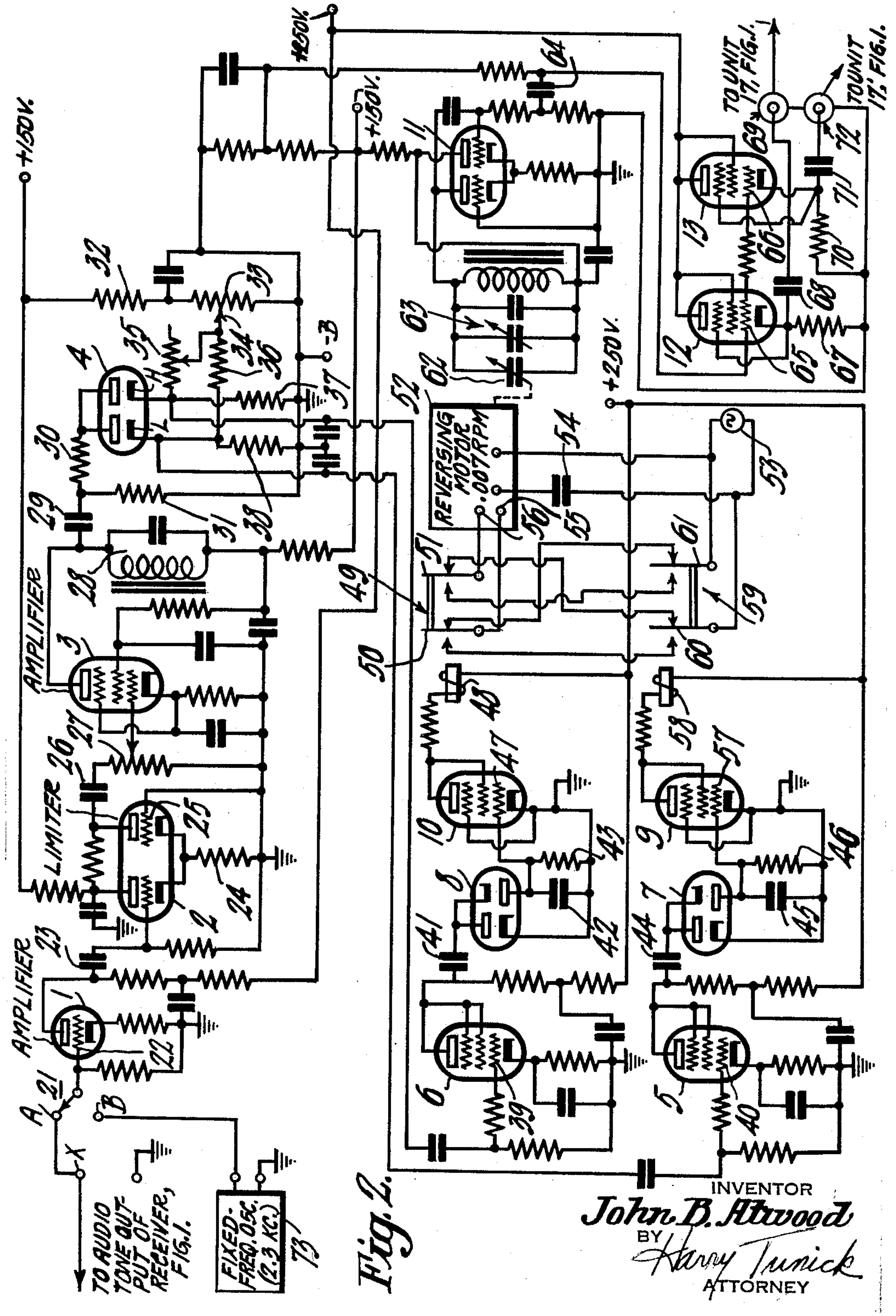

The foregoing and other objects of the invention will be best understood from the following description of an exemplification thereof, reference being had to the accompanying drawings, wherein:

Fig. 1 is a somewhat simplified block diagram of a diversity receiver for RFCS radiophoto signalling, in which the frequency control system of the present invention may be used; and Fig. 2 is a circuit diagram of the frequency control system of the present invention.

The objects of this invention are accomplished, briefly, in the following manner: The audio tone output of the receiver is passed through a tuned circuit designed to provide more or less linear variations in output voltage with variations in input frequency at and around the predetermined or assigned "black frequency." The output of the tuned circuit is fed to two diodes having different cathode biases, the voltage across the diode cathode resistors being separately amplified and utilized to control, for energization or deenergization, two separate relays the contacts of which are interconnected and arranged to control the supply of alternating current energy from a source to a motor which drives a tuning capacitor in the controlled oscillator, the contacts being arranged to supply energy in either of two opposite directions to such motor. When the "black frequency" is less than its desired predetermined value, neither diode conducts and the relays are both energized to cause the motor to increase the receiver audio output frequency. When the "black frequency" is at its predetermined value, only one diode conducts and one relay is deenergized to stop the motor, while when the "black frequency" is greater than its desired value, both diodes conduct to deenergize both relays to cause the motor to decrease the receiver audio output frequency.

Now referring to Fig. 1, there is shown, in greatly simplified form, a diversity receiving system for RFCS radiophoto signals, somewhat in accordance with my copending application, Serial No. 118,618, filed September 29, 1949, which ripened on January 6, 1953, into Patent No. 2,624,834. An antenna 14 receives the transmitted RFCS radiophoto signal and supplies it to a radio frequency (R. F.) amplifier and converter 15 of the heterodyne type which is supplied with radio frequency heterodyning energy from a radio frequency oscillator 16, the converter operating to beat down the input energy (which may be centered at 15 megacycles, as indicated) to a first I. F. centered at 450 kilocycles. If diversity reception is used, in accordance with my aforesaid copending application, the transmitted signal is also received by a separate spaced antenna corresponding to antenna 14 and is supplied to a separate R. F. amplifier and converter similar to that denoted by 15 and which is also supplied with heterodyning energy from the common R. F. oscillator 16. The frequency of oscillator 16 may be varied, as indicated in the drawing. In the drawing, FS represents the frequency deviation of the signal, the amount of which depends upon picture intelligence.

The first I. F. output of unit 15 is supplied to an I. F. amplifier and converter 17 of the heterodyne type which is supplied with I. F. heterodyning energy from an I. F. oscillator unit 18, the converter operating to beat down the I. F. input energy to a second I. F. centered at 50 kilocycles. The I. F. oscillator unit 18 is controlled in frequency by means of an AFC circuit as shown in Fig. 2, to be described in detail hereinafter; the reference numeral 18, therefore, is used to denote the entire oscillator and AFC circuit of Fig. 2. The common I. F. oscillator unit 18 may also supply heterodyning energy to a corresponding intermediate frequency amplifier and converter 17′ in the other signal channel of a two-set diversity receiving system, as disclosed in my copending application above referred to.

The output of 17 (and also of 17′ of the diversity system) is supplied, through gate circuits controlled by gate control units (not shown in Fig. 1, but which may be as disclosed in my aforesaid application), the purpose of which is to select and apply to a common output circuit that signal version which is the better of the two versions received in diversity, to a final converter 19 in such common output circuit. Converter 19 is of the heterodyne type and is supplied with heterodyning energy from an oscillator 20, converter 19 operating to beat down the input energy applied thereto to a center frequency of 1900 cycles, so that the output of such converter is audio tone or audio frequency which varies from 1500 to 2300 cycles in accordance with picture values. The 2300-cycle frequency is the "black frequency," and is the reference frequency, produced once each drum revolution at the transmitter, which must be maintained substantially constant.

A portion of the heterodyned audio output of the receiver, in which the black reference frequency appears at least once during each drum revolution (it may appear more often than this if the picture being transmitted contains a black area), is taken off as indicated in Fig. 1 and applied to the input terminal X of unit 18.

Now referring to Fig. 2, the heterodyned audio output of the Fig. 1 receiver is applied to input terminal X and, when selector switch 21 is on contact A as shown, to the control grid 22 of amplifier tube 1, for amplification therein. Tube 1 is connected substantially conventionally, having the usual cathode resistor (which is unbypassed in this instance), grid leak resistor, etc. The amplified audio frequency energy is supplied from the anode of tube 1 by a coupling condenser 23 to the control grid of an amplifying and limiting stage including tube 2. The two cathodes of this double triode tube are tied together and connected to ground by a common cathode resistor 24. The grid 25 of the second triode is also grounded. The anodes of both triodes are connected to a source of direct plate potential, while the anode of the second triode is coupled for alternating currents by a condenser 26 and the potentiometric resistor 27 to the control grid of a following amplifier stage including tube 3. The amplifying limiter including tube 2 is substantially as disclosed in Crosby Patent 2,276,565, dated March 17, 1942, and operates as described therein to provide full wave limiting of voltages applied thereto. The audio output of the receiver is amplified by tube 1 to provide a suitable amplitude for the proper operation of limiter 2.

The limited audio frequency energy is amplified in tube 3 and is applied to a parallel resonant or tuned circuit 28 in the output thereof. Circuit 28 is preferably a parallel LC circuit, as indicated, and is tuned to, or resonant at, a frequency slightly higher than 2300 cycles, so that the desired reference or black frequency is located on one side of the peak of its input frequency-output voltage characteristic, for reasons that will hereinafter appear. Since circuit 28 is a tuned circuit, the output voltage across such circuit will vary with the frequency of the signal input applied thereto, and said circuit is designed to have a substantially linear variation of output voltage with input frequency over the normal operating range, with a slope of about one output volt per input cycle.

The output of the tuned circuit 28, or the voltage thereacross, is fed by means of condenser 29, resistor 30 and leak resistor 31, to the anodes of two diodes in a double diode tube 4. A voltage divider, consisting of a fixed resistor 32 and a potentiometric resistor 33 having a movable tap 34 thereon, is connected between the positive side of the potential source and the negative side thereof or ground, in order to supply a positive bias (relative to ground) to the cathodes of the two diodes. Movable tap 34 is connected through resistor 35 to one diode cathode H in tube 4, while said tap is connected through resistor 36 to the other diode cathode L in tube 4. The two diodes of tube 4 have differing positive biases on their cathodes (resistor 35 having a lower value of resistance than resistor 36), the cathode H having a higher positive bias than cathode L. Cathode H is connected to ground by a cathode load resistor 37 while cathode L is connected to ground by an equal load resistor 38; resistor 35 is made variable, as shown, to allow for manufacturing tolerances in resistors 36, 37, and 38.

The voltage across diode cathode resistor 37 is applied to control grid 39 of amplifier tube 6, while the voltage across resistor 38 is applied to control grid 40 of amplifier tube 5. Tubes 5 and 6 are connected substantially conventionally as separate amplifiers, each having the usual cathode resistance and condenser unit and grid leak resistance, etc.

The black material which covers the gripper bar of the drum at the transmitter is of such shade that it produces a frequency thereat which is at one extreme end of the frequency shift range of the radio frequency carrier, there being no areas blacker than this in any picture to be transmitted. As a result, once each revolution of the drum there is transmitted, for a finite time interval, the frequency corresponding to black, which is intended to be maintained at 2300 cycles in the output of the receiver. This finite time interval is long compared to the time of one cycle of the 2300-cycle wave, so that a rather large number of cycles of such wave appear across tuned circuit 28 during such interval. Alternating voltage of substantially sinusoidal waveform appears across circuit 28 during the finite time interval of reception of the black reference frequency, and, if one or both of the diodes of tube 4 conducts during this finite time interval to produce half-wave rectification of the sinusoidal wave applied thereto, D. C. pulses will appear across that one or both of the resistors 37 and 38 in circuit with the corresponding conducting diode. These D. C. pulses across resistors 37 and 38 are amplified substantially without distortion by the corresponding amplifier tube 6 or 5 and appear in the anode circuit of such tube.

The biases on diode cathodes H and L are such that the circuit so far described operates in the manner to be now explained. If the audio input frequency from the receiver to the Fig. 2 circuit has a maximum value (represented by the black or reference frequency) of less than 2300 cycles, the output of tuned circuit 28 is less than that required to overcome the positive cathode bias on either diode of tube 4, so that under these conditions there are no signal peaks or D. C. pulses appearing across either of the resistors 37 or 38 or in the anode circuits of either of tubes 5 or 6.

When the maximum input frequency to circuit 28 is 2300 cycles, the peak output of such circuit overcomes the positive bias on diode cathode L, since now we are further up on the output voltage-input frequency characteristic of circuit 28 and the output of such circuit is greater; under these conditions D. C. pulses appear across the resistor 38 and in the anode circuit of tube 5. Under these conditions the output of circuit 28 is not sufficient to overcome the positive bias on cathode H (it will be remembered that cathode H has a higher bias than cathode L), so nothing appears across cathode resistor 37 or in the anode circuit of tube 6.

Finally, when the maximum input frequency to circuit 28 is slightly higher than 2300 cycles, such as approximately 2302 cycles, we are still further up on the output voltage-input frequency characteristic of circuit 28 and the output of such circuit is even greater (it will be recalled that the circuit 28 is tuned to a frequency higher than 2300 cycles, so that until the peak of its response curve is reached, the voltage output of such circuit increases with increasing input frequency). Under these conditions the output of circuit 28 is sufficient to overcome the positive biases on both cathodes H and L, so that now D. C. pulses appear across both resistors 37 and 38 and in the anode circuits of both tubes 6 and 5.

The anode of tube 6 is connected through a condenser 41 and a full-wave-type charging diode 8 to capacitor 42 which is shunted by resistor 43. Signal peaks or pulses appearing across cathode resistor 37 are amplified by tube 6 and are utilized to charge capacitor 42 through diode 8 negatively with respect to ground, to which the lower plate of said capacitor is connected. Resistor 43 across capacitor 42 provides the desired time constant for the discharge of said capacitor.

Similarly, the anode of tube 5 is connected through a condenser 44 and a full-wave-type charging diode 7 to capacitor 45 which is shunted by resistor 46. Signal peaks or pulses appearing across cathode resistor 38 are amplified by tube 5 and are utilized to charge capacitor 45 through diode 7 negatively with respect to ground, to which the lower plate of said capacitor is connected. Resistor 46 across capacitor 45 provides the desired time constant for the discharge of said capacitor.

The upper plate of capacitor 42 is connected to the control grid 47 of amplifying tube 10 in the anode circuit of which is the winding 48 of a relay 49 having two armatures 50 and 51 each cooperating with a front contact and a back contact, the armatures each resting on their back contacts in the illustrated deenergized position of the relay. The armatures 50 and 51 are each connected to a separate terminal of a reversing motor 52 of the alternating current type, this motor having also two other terminals to which are connected leads from opposite sides of an alternating current source indicated at 53, there being a phasing capacitor 54 in series in one of the last-mentioned leads. Motor 52 is of the type which is capable of having its direction of rotation reversed by interchanging the connections from the source 53 to the motor terminals 55 and 56, to which are connected, respectively, the armatures 50 and 51.

The upper plate of capacitor 45 is connected to the control grid 57 of amplifying tube 9 in the anode circuit of which is the winding 58 of a relay 59 having two armatures 60 and 61 each cooperating with a front contact and a back contact, the armatures each resting on their back contacts in the illustrated deenergized position of the relay. The front contacts for armatures 50 and 60 are connected together, the back contacts for armatures 50 and 61 are connected together, the front contacts for armatures 51 and 61 are connected together, and the back contacts for armatures 51 and 60 are connected together. Finally, the armatures 60 and 61 are connected to opposite sides of source 53.

Motor 52 drives, in either of two opposite directions, a condenser 62 in the tank circuit 63 of an oscillator including tube 11 which is connected substantially conventionally to produce oscillations in the I. F. range, rotary movement of condenser 62 by motor 52 producing capacitance variations thereof and consequent variations in the output frequency of the I. F. oscillator 11 which is the common I. F. oscillator feeding into units 17 and 17' of Fig. 1.

Assume, now, that the maximum input frequency to circuit 28 is slightly higher than 2300 cycles, for example approximately 2302 cycles. Under these conditions, signal peaks appear across both resistors 37 and 38, charging both capacitors 42 and 45 negatively with respect to ground. The negative voltages on these capacitors 42 and 45 are applied to the respective grids 47 and 57 of tubes 10 and 9, cutting off such tubes and deenergizing relays 49 and 59 so that they are in the position illustrated. Circuits may now be traced to motor 52 as follows: lower lead of source to motor terminal 56 via armature 60, back contact for 60, back contact for armature 51, and armature 51; upper lead of source to motor terminal 55 via armature 61, back contact for 61, back contact for armature 50, and armature 50. This causes the motor 52 to drive condenser 62 in one direction, the connections being so arranged that this direction is such as to correct (lower) the maximum audio input frequency to circuit 28, or at terminal X; from a consideration of Fig. 1, it may be seen that variations in frequency of the common heterodyning I. F. oscillator unit 18 will cause corresponding frequency variations in the audio tone output of the receiver, which is applied to terminal X.

When the maximum input frequency to circuit 28, or at terminal X, has returned to 2300 cycles, no signal peaks appear across resistor 37, so that capacitor 42 is no longer charged negatively through diode 8. The negative charge on 42 gradually leaks off through shunt resistor 43, removing the negative bias on tube 10. Tube 10 then conducts, energizing relay 49 to stop motor 52 by breaking the motor energizing circuit at the back contacts for armatures 50 and 51.

If, now, the maximum input frequency to circuit 28, or at terminal X, drifts to a value slightly below 2300 cycles, such as about 2298 cycles for example, no signal peaks appear across either resistor 37 or 38 and capacitor 45 no longer is charged negatively through diode 7. The negative charge on 45 gradually leaks off through shunt resistor 46, removing the negative bias on tube 9. Tube 9 then conducts, energizing relay 59. A circuit for energizing motor 52 is now set up as follows: lower lead of source to motor terminal 55 via armature 60, front contact for 60, front contact for armature 50, and armature 50; upper lead of source to motor terminal 56 via armature 61, front contact for 61, front contact for armature 51, and armature 51. This causes the motor to drive condenser 62 in the reverse direction, this direction being such as to correct (raise) the maximum audio input frequency to circuit 28, or at terminal X.

When the maximum input frequency to circuit 28, or at terminal X, has returned to 2300 cycles, signal peaks again appear across resistor 38, charging capacitor 45 negatively through diode 7, thereby cutting off tube 9 to deenergize relay 59 and stop motor 52 by breaking the motor energizing circuit at the front contacts for armatures 60 and 61.

For diversity reception, as schematically illustrated in Fig. 1, the oscillator including tube 11 is the common I. F. oscillator for converters 17 and 17' of the two diversity channels. The output of oscillator tube 11 is therefore applied through coupling condenser 64 to the control grids 65 and 66 of two corresponding tubes 12 and 13 each constituting a cathode follower stage which is connected in a more or less conventional manner. Output across the cathode resistor 67 of tube 12 is applied through a condenser 68 to the inner conductor of a coaxial line 69 which is coupled to the I. F. amplifier and converter unit 17 of the Fig. 1 receiver. Output across the cathode resistor 70 of tube 13 is applied through a condenser 71 to the inner conductor of a coaxial line 72 which is coupled to the I. F. amplifier and converter unit 17' of the Fig. 1 receiver. The oscillator including tube 11 therefore supplies heterodyning I. F. energy to the two converters 17 and 17' of Fig. 1. The cathode follower stage tubes 12 and 13 reduce the output impedance of oscillator tube 11 to match the impedances of the coaxial lines 69 and 72, and also serve to prevent any coupling between units 17 and 17' of the receiver through the common oscillator.

How close to the predetermined desired value the frequency is held, is determined by the difference in the biases on the diode cathodes H and L and by the slope of the characteristic of tuned circuit 28. Contact B of selector switch 21 is connected to a stable 2300-cycle oscillator, so that, when said switch is on such contact, the input of the Fig. 2 circuit is supplied with the desired frequency of 2300 cycles. When switch 21 is operated to be on contact B, thus supplying a 2300-cycle input, the amplitude of the voltage across tuned circuit 28 may be adjusted so that the motor 52 will stop at this frequency. This adjustment may be made by adjustment of the potentiometer 27 in the grid circuit of tube 3. Limiter 2 permits the system to function properly under various conditions of amplitude of receiver output.

The system of this invention is not limited in application to carrier shift radiophoto signaling, but will also operate on frequency shift telegraphy.

The circuit is also not limited to using a tuned circuit 28 to provide the necessary variation of output voltage with input frequency. In fact, using a tuned circuit is disadvantageous if the audio input frequency happens to drift to an extent such that it is considerably higher than the frequency to which the circuit is tuned. If this should happen, the circuit will act to change the frequency to higher and higher values, since in this case (the characteristic of the tuned circuit being somewhat of inverted U-shape) the amplitude of the output voltage across the tuned circuit would again be insufficient to overcome the bias on either diode cathode, a situation exactly like that existing when the input frequency is less than 2300 cycles. This effect can be easily overcome by using, instead of tuned circuit 28, several amplifier stages coupled together, each stage having an untuned inductance in its plate circuit and its plate being coupled to the grid of the next stage by a small capacitor, for example.

What I claim to be my invention is:

1. A frequency control system for an oscillator, comprising a single tuned circuit responsive to an alternating input wave for producing therefrom an alternating voltage the amplitude of which varies with the frequency of said wave, means coupled to said tuned circuit and responsive to frequency-dependent produced alternating voltages of peak amplitude above a first threshold value for deriving therefrom a first potential, means coupled to said tuned circuit and responsive to frequency-dependent produced alternating voltages of peak amplitude above a second threshold value for deriving therefrom a second potential, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials, and to disconnect the motor from its source of energy in response to the presence of one such potential and the absence of the other such potential.

2. A frequency control system for an oscillator, comprising means responsive to an alternating input wave for producing therefrom an alternating voltage the amplitude of which varies with the frequency of said wave, a rectifier coupled to receive the produced alternating voltage and biased to rectify said voltage, thereby to produce a first potential, only when the peak amplitude of said produced voltage is greater than a first threshold value, means coupled to said first-named means and responsive to frequency-dependent produced alternating voltages of peak amplitude above a second threshold value for deriving therefrom a second potential, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials, and to disconnect the motor from its source of energy in response to the presence of one such potential and the absence of the other such potential.

3. A frequency control system for an oscillator, comprising means responsive to an alternating input wave for producing therefrom an alternating voltage the amplitude of which varies with the frequency of said wave, means coupled to said first-named means and responsive to frequency-dependent produced alternating voltages of peak amplitude above a first threshold value for deriving therefrom a first potential, a rectifier coupled to receive the produced alternating voltage and biased to rectify said voltage, thereby to produce a second potential, only when the peak amplitude of said produced voltage is greater than a second threshold value, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials, and to disconnect the motor from its source of energy in response to the presence of one such potential and the absence of the other such potential.

4. A frequency control system for an oscillator, comprising a tuned circuit responsive to an alternating input wave for producing therefrom an alternating voltage the amplitude of which varies with the frequency of said wave, a rectifier coupled to receive the produced alternating voltage and biased to rectify said voltage, thereby to produce a first potential, only when the peak amplitude of said produced voltage is greater than a first threshold value, means coupled to said tuned circuit and responsive to frequency-dependent produced alternating voltages of peak amplitude above a second threshold value for deriving therefrom a second potential, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials, and to disconnect the motor from its source of energy in response to the presence of one such potential and the absence of the other such potential.

5. A frequency control system in accordance with claim 1, wherein the second-named means includes a storage element across which the first potential appears, said element being charged from the produced alternating voltage when the same is of peak amplitude above the first threshold value, wherein the amplitude of said produced alternating voltage varies substantially directly with the wave frequency, wherein the second threshold value is higher than said first threshold value and wherein the other potential is the second potential.

6. A frequency control system for an oscillator, comprising means responsive to an alternating input wave for producing therefrom an alternating voltage the amplitude of which varies with the frequency of said wave, means coupled to said first-named means and responsive to produced voltages of peak amplitude above a first threshold value for deriving therefrom a first potential, means coupled to said first-named means and responsive to produced voltages of peak amplitude above a second threshold value for deriving therefrom a second potential, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials and to disconnect the motor from its source of energy in response to the presence of one such potential and the absence of the other such potential, said last-named means including a pair of relays each having an energizing winding and a plurality of movable contacts each cooperating with a plurality of fixed contacts, the movable contacts and fixed contacts being interconnected with each other and being located between the motor's source and the motor, one energizing winding being controlled by said first potential and the other energizing winding being controlled by said second potential.

7. A frequency control system for an oscillator, comprising means responsive to an alternating input wave for producing therefrom an alternating voltage the amplitude of which varies substantially directly with the frequency of said wave, means coupled to said first-named means and responsive to frequency-dependent produced alternating voltages of peak amplitude above a first threshold value for deriving therefrom a first potential, a rectifier coupled to receive the produced alternating voltage and biased to rectify said voltage, thereby to produce a second potential, only when the peak amplitude of said produced voltage is greater than a second threshold value, a storage element, across which said second potential appears, coupled to the output of said rectifier, the second threshold value being higher than the first threshold value, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials, and to disconnect the motor from its source of energy in response to the presence of the said first potential and the absence of the said second potential.

8. A frequency control system in accordance with claim 3, wherein the second-named means includes a rectifier coupled to receive the produced alternating voltage and biased to rectify said voltage only when the peak amplitude of same is greater than the first threshold value.

9. A frequency control system in accordance with claim 4, wherein the third-named means includes a rectifier coupled to receive the produced alternating voltage and biased to rectify said voltage only when the peak amplitude of same is greater than the second threshold value.

10. A frequency control system for an oscillator, comprising means responsive to an alternating input wave for producing therefrom an alternating voltage the amplitude of which varies with the frequency of said wave, means coupled to said first-named means and responsive to produced voltages of peak amplitude above a first threshold value for deriving therefrom a first potential, said last-named means including a rectifier coupled to receive the produced alternating voltage, said rectifier being biased to rectify said voltage only when the peak amplitude of same is greater than said first threshold value, and including also a storage element, across which said first potential appears, coupled to the output of said rectifier, means coupled to said first-named means and responsive to produced voltages of peak amplitude above a second threshold value for deriving therefrom a second potential, a motor for driving a frequency-determining element in the oscillator to be controlled, and means controlled by said first and second potentials to complete an energizing circuit of one relative polarity for said motor in response to the presence of both such potentials, to complete an energizing circuit of the opposite relative polarity for said motor in response to the absence of both such potentials and to disconnect the motor from its source of energy in response to the presence of one such potential and the absence of the other such potential, said last-named means including a pair of relays each having an energizing winding and a plurality of movable contacts each co-operating with a plurality of fixed contacts, the movable contacts and fixed contacts being interconnected with each other and being located between the motor's source and the motor, one energizing winding being controlled by said first potential and the other energizing winding being controlled by said second potential.

11. A frequency control system in accordance with claim 10, wherein the third-named means includes a rectifier coupled to receive the produced alternating voltage, said rectifier being biased to rectify said voltage only when the peak amplitude of same is greater than the second threshold value, and a storage element, across which the second potential appears, coupled to the output of said rectifier, the other energizing winding being controlled by the potential across said storage element.

12. A frequency control system in accordance with claim 11, wherein the first-named means consists of a tuned circuit to which the alternating input wave is applied, wherein the amplitude of the produced alternating voltage varies substantially directly with the wave frequency, wherein the second threshold value is higher than the first threshold value, and wherein the other potential is the second potential.

JOHN B. ATWOOD.

References Cited in the file of this patent

UNITED STATES PATENTS

| Number | Name | Date |
|---|---|---|
| 2,018,820 | Usselman | Oct. 29, 1935 |
| 2,297,800 | Read | Oct. 6, 1942 |
| 2,357,984 | Travis | Sept. 12, 1944 |
| 2,379,689 | Crosby | July 3, 1945 |
| 2,464,818 | Learned | Mar. 22, 1949 |
| 2,511,137 | Wheeler | June 13, 1950 |
| 2,545,297 | Mittelmann | Mar. 13, 1951 |